(12) United States Patent
Page et al.

(10) Patent No.: US 10,454,978 B2
(45) Date of Patent: Oct. 22, 2019

(54) SYSTEMS AND METHODS FOR DYNAMIC LATENCY REDUCTION FOR CONFERENCING

(71) Applicant: INCONTACT, INC., Sandy, UT (US)

(72) Inventors: Matthew Lawrence Page, Sandy, UT (US); Michael Keith Johnson, Willard, UT (US)

(73) Assignee: INCONTACT, INC., Sandy, UT (US)

( * ) Notice: Subject to any disclaimer, the term of this patent is extended or adjusted under 35 U.S.C. 154(b) by 16 days.

(21) Appl. No.: 15/819,206

(22) Filed: Nov. 21, 2017

(65) Prior Publication Data
US 2019/0158546 A1    May 23, 2019

(51) Int. Cl.
*H04L 29/06*    (2006.01)

(52) U.S. Cl.
CPC ........ *H04L 65/1083* (2013.01); *H04L 65/103* (2013.01); *H04L 65/1006* (2013.01); *H04L 65/1036* (2013.01); *H04L 65/1046* (2013.01); *H04L 65/403* (2013.01); *H04L 65/608* (2013.01); *H04L 65/80* (2013.01); *H04M 2203/5081* (2013.01)

(58) Field of Classification Search
CPC ............. H04L 65/1083; H04L 65/1006; H04L 65/608; H04L 65/1036; H04L 65/103; H04L 65/80; H04L 65/1046; H04L 65/403; H04M 2203/5081
See application file for complete search history.

(56) References Cited

U.S. PATENT DOCUMENTS 6,584,076 B1 *   6/2003   Aravamudan .......... H04M 3/56
                                                                   370/260

* cited by examiner

*Primary Examiner* — Dady Chery
(74) *Attorney, Agent, or Firm* — Pearl Cohen Zedek Latzer Baratz LLP

(57) ABSTRACT

Methods and systems for reducing latency during conference calls are provided. The method and system can involve a conference call coordinator that evaluates the regions of participants in the call each time a call is added or dropped and transfers the conference call to a media server in the appropriate region.

10 Claims, 5 Drawing Sheets receiving, by a conference call coordinator, an indicator that one user device of a plurality of user devices participating in the conference call has joined or left the conference, wherein the conference call is served by a first media server
510 determining, by the conference call coordinator, whether the first media server continues to service the conference call or whether to move the conference call to a second media server based on whether the conference call has a majority of the plurality of user devices in a geographical region of the first media server
520 if the conference call is to be moved, determining a media server to move the conference call too based on availability of one or more media servers servicing the plurality of user devices and moving the conference call to the second media server serving the geographic region of the majority of user devices
530

FIG. 5

SYSTEMS AND METHODS FOR DYNAMIC LATENCY REDUCTION FOR CONFERENCING

FIELD OF THE INVENTION

The invention relates generally to conference calling. In particular, reducing latency for conference calling between geographically dispersed participants of a conference call.

BACKGROUND OF THE INVENTION

Currently, conference calling can involve geographically dispersed participants. For example, a conference call can be between participants on different continents, in different cities, etc. Commonly, a single media server having a mixer is used to facilitate the conference call. For example, each participant in the call is typically using a device (e.g., a smart phone, voice over IP phone, computer, etc.). When the device initiates connection to the conference call, a media server having a mixer is assigned to service the conference call. As each participant connects to the call, the mixer can allow all participants in the conference call to input audio to the mixer and to speak during the conference. The mixer can decide which participant's audio is output to each party.

Currently, service providers can have Session Border Controller (SBC), or other network border devices in physical data centers dispersed geographically throughout the world. Border devices comprise, routers, firewalls, network address translators (NAT), back-to-back User Agents, and combinations thereof such as a Session Border Controller (SBC). As is common in the art, these are connected to external networks as well as to internal private networks. Service providers (e.g. internet telephony service providers or traditional telecommunications carriers) can route calls through external networks to border devices, based on routing rules. The call can be routed from border devices to a media server within the internal network and they can connect to the conference. The internal network can be divided into subnets. Subnets may be organized according to geographic regions serviced by one or more data centers. Subnets may interface to external networks through border devices.

In a first example, the first participant to connect to the conference call is within the Northeast of the United States, and a media server within an internal subnet assigned to service the Northeast of the United States can act as the media server for the conference. As other participants of the conference call connect to the conference, regardless of where they are geographically located, the media server that was selected at the start of the conference call is the media server that services the duration of the conference call. Continuing with the example, if participants connect from Asia and Europe, the media server that services the Northeast continues to service the conference call.

If during the conference call any participant leaves the conference call, the initial media server continues to service the conference call. Continuing with the example, if the participant that resides in the Northeast of the United States leaves the conference, the media server that services the Northeast continues to service the conference call, even though there are no participants in the Northeast remaining on the conference call. This can cause unnecessary delay (e.g., latency) in the audio between the remaining parties due to the network distance needed for voice media to be transmitted across. Such delay is especially unnecessary if the remaining parties are from regions closer to each other than they are to the initial region.

Therefore, it can be desirable to minimize latency of a conference call for geographically proximal participants. Failure to minimize latency can result in unwanted effects such as audio echo and/or talk-over between the parties.

SUMMARY OF THE INVENTION

One advantage of the invention can include reducing audio delay during a conference call. Another advantage can include reduction of bandwidth consumption across a private network, which can also reduce cost of operation. Other advantages of the invention can include reducing audio echo and/or reducing an amount of talk-over between the parties.

In one aspect, the method involves reducing latency during a conference call. The method also involves receiving, by a conference call coordinator, an indicator that one user device of a plurality of user devices participating in the conference call has left the conference, wherein the conference call is served by a first media server. The method also involves determining, by the conference call coordinator, whether the first media server continues to service the conference call or whether to move the conference call to a second media server based on whether the conference call has a majority of the plurality of user devices in a geographical region of the first media server. If the conference call is to be moved, determining a media server to move the conference call to, based on availability of one or more media servers servicing the plurality of user devices, and moving the conference call to the second media server serving the geographic region of the majority of user devices.

In some embodiments, the determination involves determining all border devices servicing the plurality of user devices, and for each SBC, evaluating a Real-Time Transport Protocol (RTP) Internet Protocol (IP) address and using the subnet of that address to determine the corresponding geographical region.

In some embodiments, moving the conference call to the second media server involves the conference call coordinator transmitting to the second media server a command to take over servicing the conference call and media streams. An example command can be a Session Initiated Protocol (SIP) target refresh message.

In another aspect, the invention includes a system for reducing latency during a conference call. The system includes a plurality of devices that allow users to connect to the conference call. The system also includes a first media server that serves the conference call. The system also includes a conference call coordinator that receives an indication that one user device of a plurality of user devices has left or joined the conference call. The conference call coordinator determines whether the first media server continues to service the conference call or whether to move the conference call to a second media server based on whether the conference call has a majority of the plurality of user devices in a geographical region of the first media server, and moving the conference based on availability of one or more media servers servicing the plurality of user devices and relocating the conference call. The system also includes a second media server to serve a relocated conference call.

In some embodiments, the system includes a plurality of border devices that serve one or more of the plurality of user devices, and wherein the conference call coordinator determines whether the first media server continues to service the conference call based on a geographical region of the respective border device of the plurality of border devices, the geographical region of border devices as evaluated in the subnet of the Real-Time Protocol (RTP) Internet Protocol (IP) address of the respective border device.

In some embodiments, the conference call coordinator transmits a command to take over servicing the conference call and media streams to the second media server via a Session Initiated Protocol (SIP) target refresh message.

In some embodiments, the geographic region to move the conference call is further based on subnet value of media streams.

In another aspect, the invention includes one or more non-transitory computer-readable storage media comprising instructions that are executable to cause one or more processors to: i) receive, by a conference call coordinator, an indicator that one user device of a plurality of user devices participating in the conference call has joined or left the conference, wherein the conference call is served by a first media server, 2) determine, by the conference call coordinator, whether the first media server continues to service the conference call or whether to move the conference call to a second media server based on whether the conference call has a majority of user devices in a geographical region of the first media server, and 3) if the conference call is to be moved, determine a media server to move the conference call to based on availability of one or more media servers servicing the plurality of user devices and moving the conference call to the second media server serving the geographic region of the majority of user devices.

In some embodiments, the instructions when executed further cause one or more processors to determine all border devices servicing the plurality of devices, and for each border device, evaluating a media stream Internet Protocol (IP) address to determine the corresponding geographical region.

In some embodiments, the instructions when executed further cause one or more processors to transmit to the second media server, by the conference call coordinator, a command to take over servicing the conference call and transferring media streams to the second media server via a Session Initiated Protocol (SIP) target refresh message.

In some embodiments, the instructions when executed further cause one or more processors to determine the region to move the conference call to is further based on the subnet values of media streams.

BRIEF DESCRIPTION OF THE DRAWINGS

Non-limiting examples of embodiments of the disclosure are described below with reference to figures attached hereto that are listed following this paragraph. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIG. 5 is a flow chart of a method for reducing latency of a conference call, according to an illustrative embodiment of the invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In general, a conference controller connected to an internal network that is aware of a subnet where media for each participant enters the internal network, can choose a media server that can be optimal for the majority of conference call participants. When participants are added or removed from the conference call, the conference controller can reevaluate the optimal subnet, choose an available media server within the subnet, and move all of the media streams of the participants to the chosen media server to be mixed there.

Figure 1:
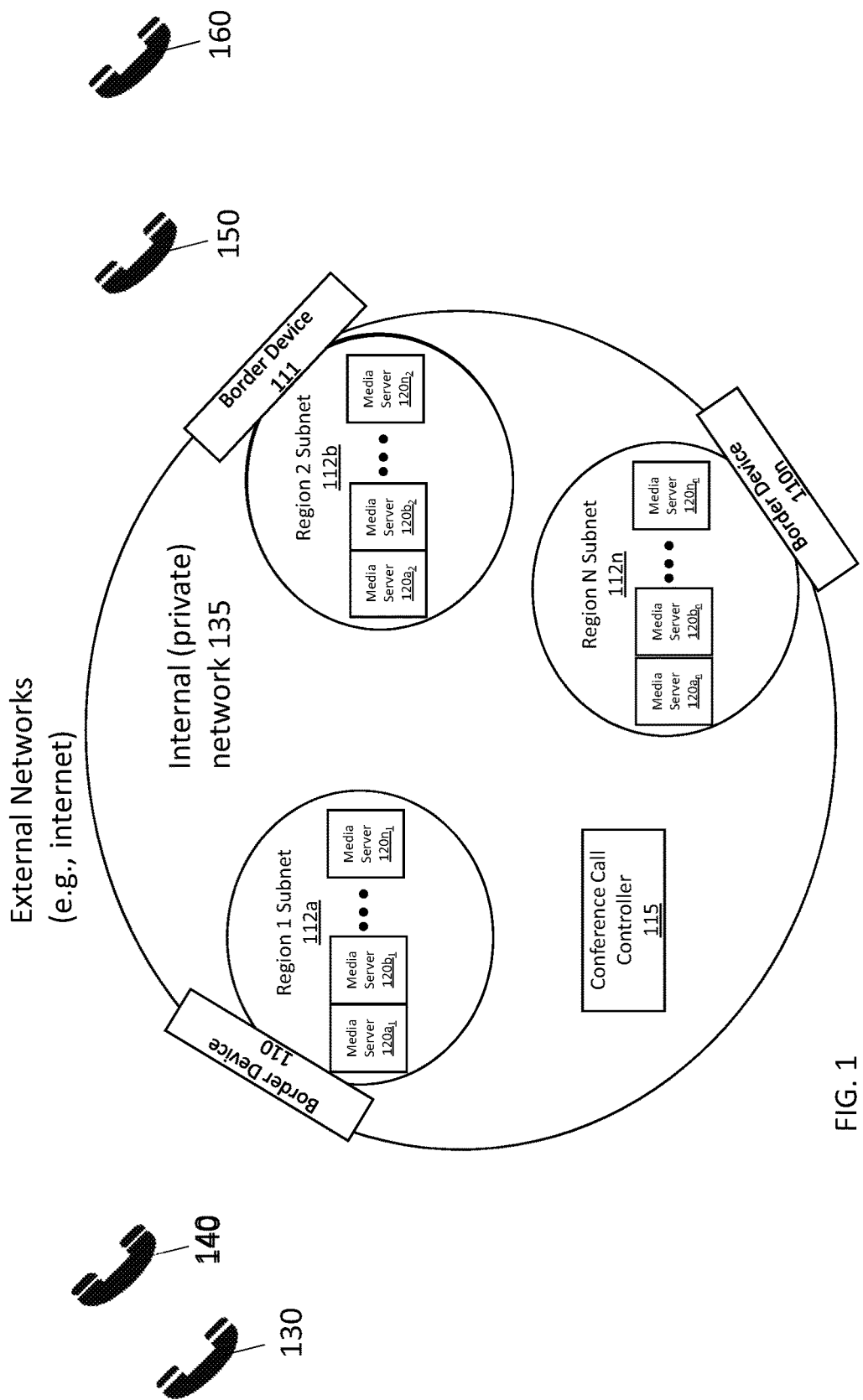
FIG. 1 is a diagram of a system for conference calling, according to an illustrative embodiment of the invention.

FIG. 1 is a diagram of a system for conference calling, according to an illustrative embodiment of the invention. The system can include external networks 145 (e.g., the internet) and internal networks 135 (e.g., private networks). The external networks 145 can communicate with one or more user devices 140, 150 and 160 respectively.

The internal networks 135 can include one or more regional subnets, e.g., region 1 subnet 112a, region 2 subnet 112b, . . . region n subnet 112n, each subnet having one or more border devices, e.g., a first border device 110, a second border device 111, and a third border device 110n, and a conference call coordinator 115. Each border device, 110, 111 and/or 110n can include multiple border devices.

The first geographic region (e.g., North America), the region 1 subnet 112a (e.g., first private subnet), which has a first plurality of media servers $120a_1, 120b_1, \ldots, 120n_1$ that communicate with the external network via the first border device 110. The second subnet 112b (e.g., second private subnet) device can serve a second geographic region (e.g., Europe) and have a second plurality of media servers $120a_2, 120b_2, \ldots, 120n_2$ that connect calls via the second border device 111. In some embodiments, the first private subnet and the second private subnet are the same private subnet. In some embodiments, the first private subnet and the second private subnet are different private subnets.

The system can include any number of private network subnets, for example, region N subnet 112n. Each private network subnet can include a border device 110n. Each private subnet can include any number of media servers $120a_n, 120b_n, \ldots, 120n_n$. The approximate geographical area serviced by a private network subnet can be any geographical region, e.g., as configured by network routing rules of various routing devices of the external network.

During operation, the conference call coordinator 115 can receive a request for a conference call from user device 140. The conference call coordinator 115 can select a particular media server of the first plurality of media servers $120a_1, 120b_1, \ldots, 120n_1$, the second plurality of media servers $120a_2, 120b_2, \ldots, 120n_2$ private subnet media servers $120a_n, 120b_n, \ldots, 120n_n$ to service the conference call (e.g., mix the call). The conference call coordinator 115 can select the particular media server based on a geographical region of one of the user devices, as is known in the art. When another user device 150 joins the conference, the callers can hear each other by virtue of the mixer in the assigned media server.

During the call, if the user device joins or leaves the conference call (e.g., the user hangs up or an additional device dials in), then the conference call coordinator 115 can determine whether the currently selected media server is to continue servicing the conference call, or whether the conference call can be advantageously moved to a different media server that is regionally closer to user devices that are still connected to the conference call. The conference call coordinator 115 can determine the network region of each of the user devices participating in the conference call by determining the subnet of each media stream of the conferenced user devices at the border device. All user devices that share a common subnet are determined to be in the same geographical region.

In some embodiments, if an equal number of devices are in two different regions, the conference call is relocated randomly to one of the two regions. In some embodiments, the conference call is relocated to the subnet of the region with the most number of devices in that region.

Figure 2:
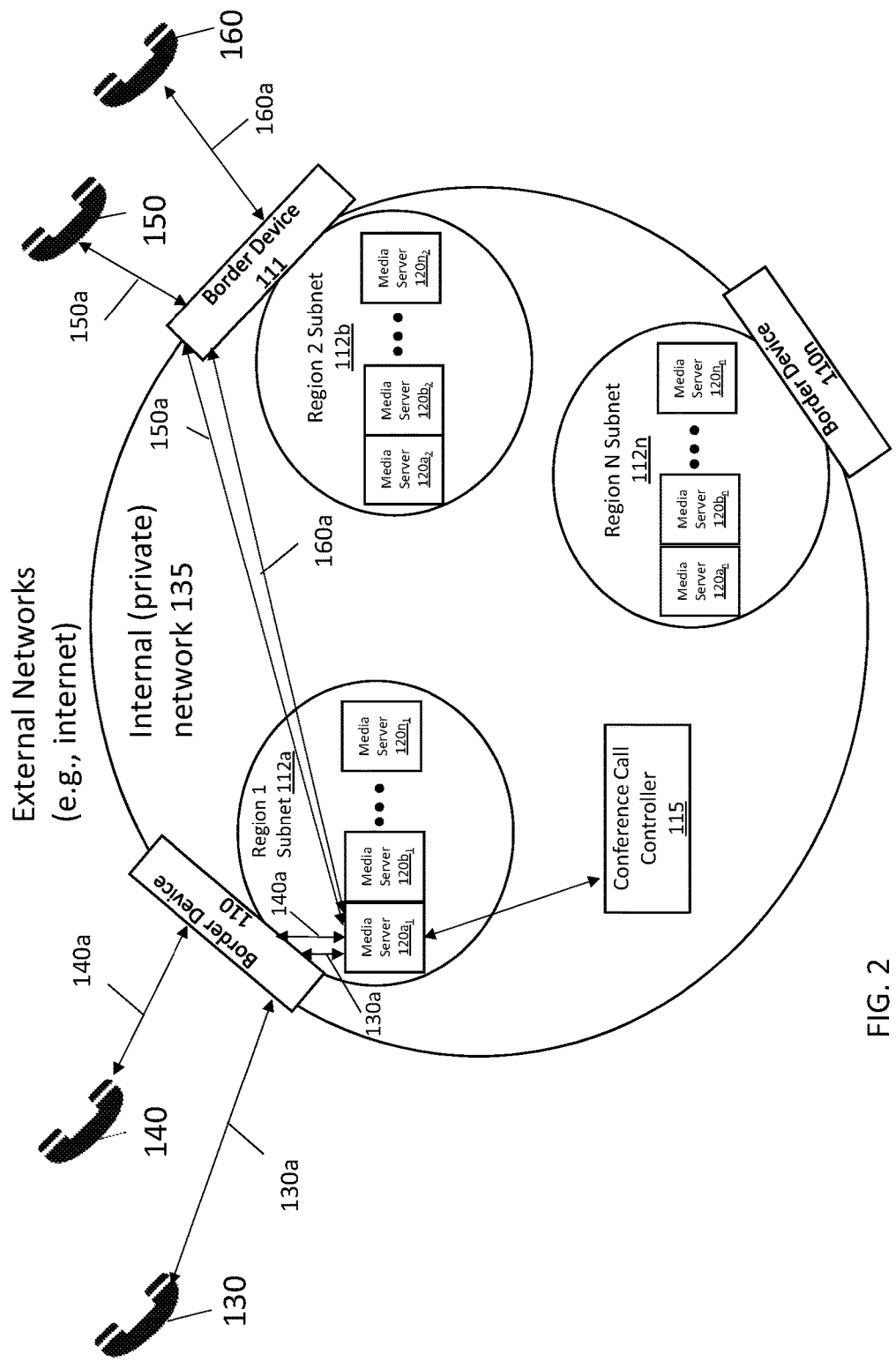
FIGS. 2-4 are diagrams showing an example of a communication flow path of the system for conference calling of FIG. 1, according to an illustrative embodiment of the invention.
Figure 3:
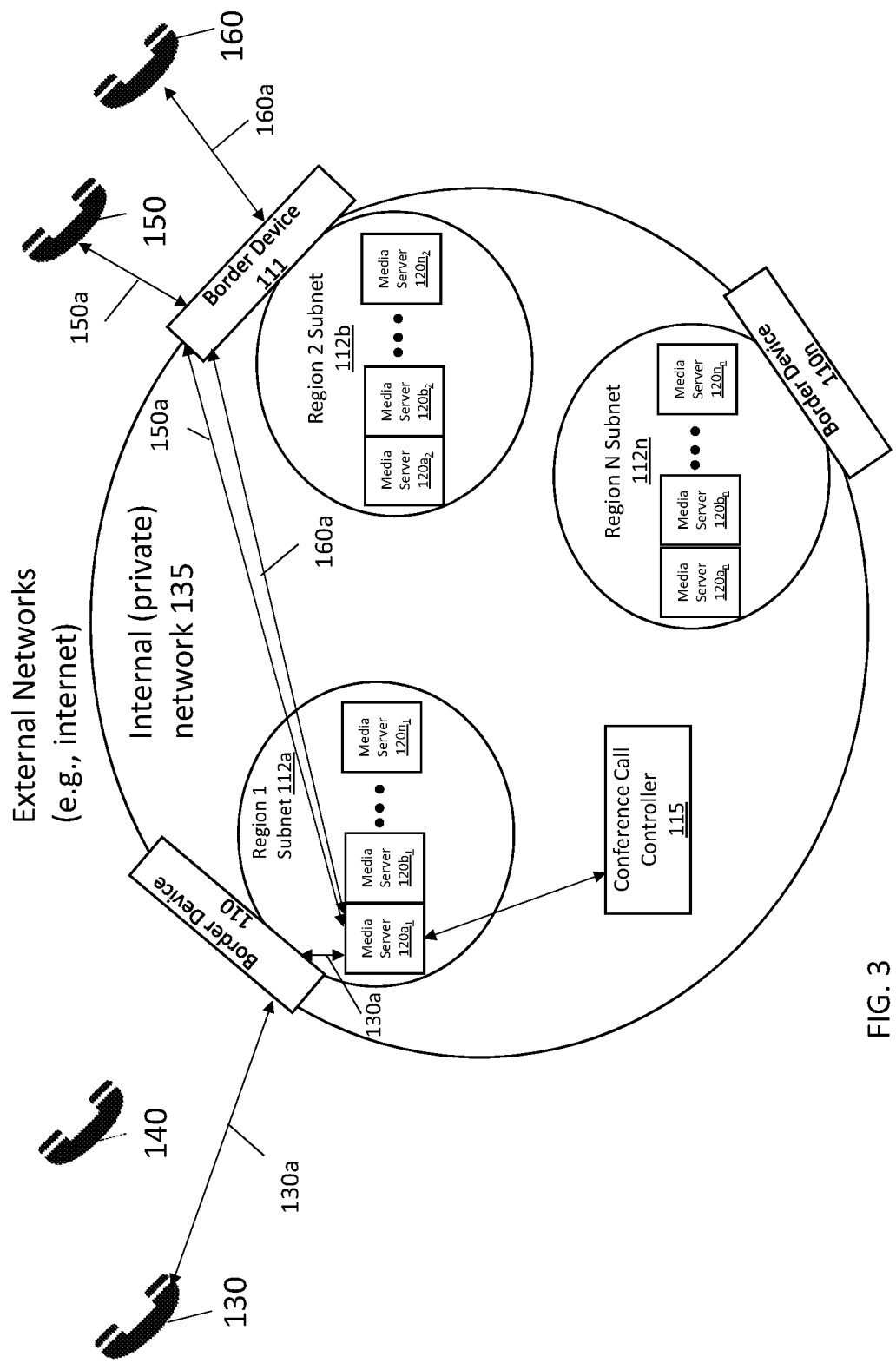
Figure 4:
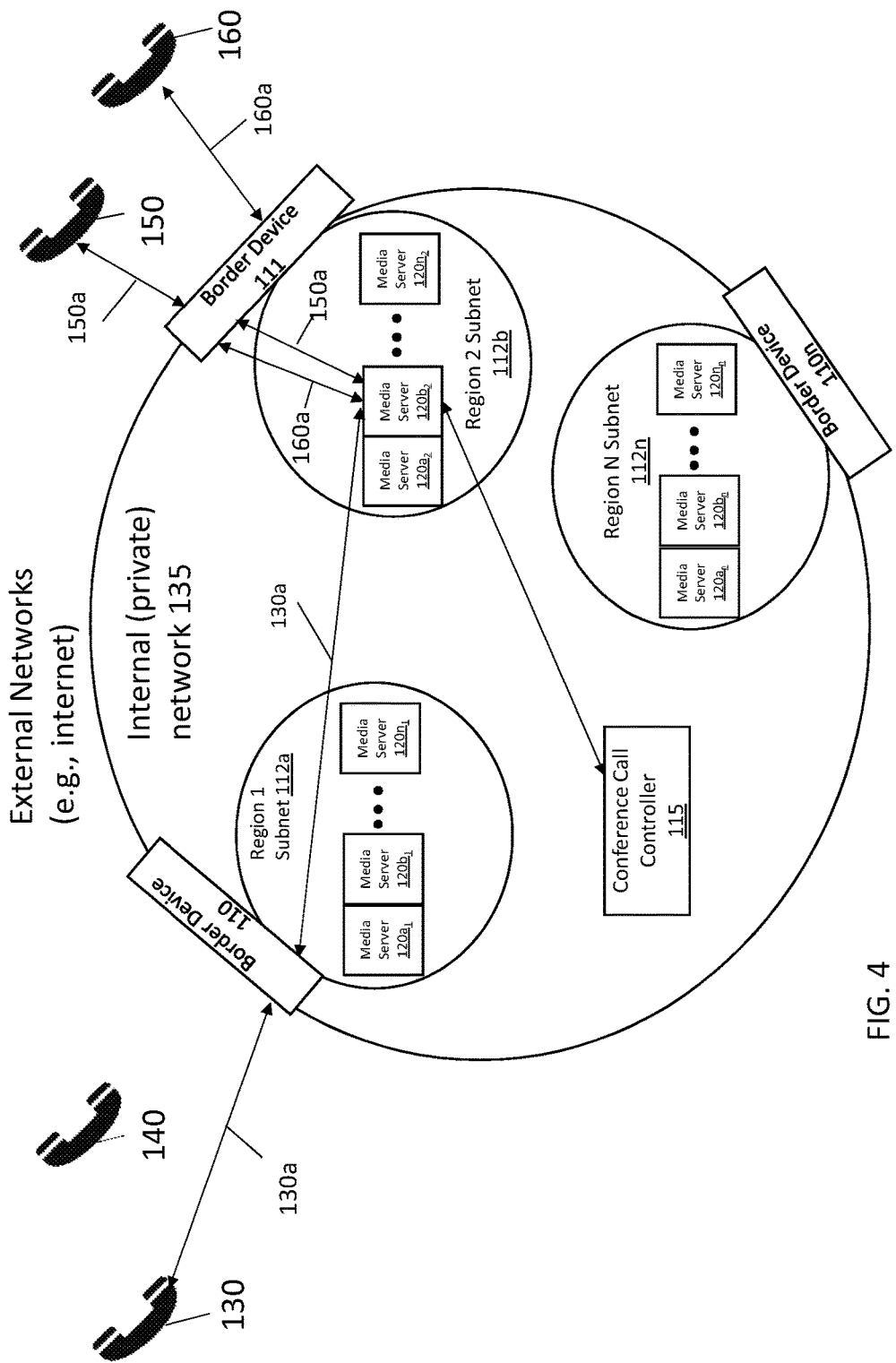

FIGS. 2-4 are diagrams showing an example of a communication flow path of the system for conference calling of FIG. 1, according to an illustrative embodiment of the invention.

Assume a user using user device 130 located in a geographical region covered by the region 1 subnet 112a (e.g. North America) initiates a conference call; the user device 130 can communicate with the media server 120a via the border device 110. The conference call coordinator 115 can receive a request for the conference call via the media server 120a. The conference call coordinator 115 can determine that media server 120a that is within the geographical region covered by the region 1 subnet (e.g., North America) has sufficient resources to service (e.g., mix) the conference call. A media stream 130a is established between the user device 130 and the media server 120a, via the border device 110. Assume another caller using user device 140 also joins the conference. Assume that user device 140 is within the same geographical region as the user device 130, a media stream 140a can be established between the user device 140 and the media server 120a via the border device 110. The conference call coordinator 115 can compare the subnet numbers (e.g., a subnet number as is known in the art and can be linked to geographical region by the design of the network) of the media streams 130a and 140a and determine that media server 120a is to continue to service the call, since both devices connect to the external network from the same subnet. The conference call coordinator 115 can also initiate calls to one or more user devices, including initiating the first call to the first user device.

Assume two additional participants wish to join the conference call via the user devices 150 and 160 located in a geographical region covered by the region 2 subnet 112b (e.g. Europe). The conference call coordinator 115 can receive requests from both devices 150 and 160 to join the conference via the border device 110b serving both user devices 150 and 160. The conference call coordinator 115 can determine that the media server 120a has been assigned to serve the conference call that user devices 150 and 160 requested to join. A media stream 150a and 160a can be established between user devices 150 and 160 to media server 120a, via the border device 111.

Assume that the user using user device 140 exits the conference call. Upon detecting that the user device 140 exited the conference call, the conference call coordinator 115 can determine whether the media server 120b is to continue servicing the conference call, or whether the conference call should be moved to a different media server that is geographically closer to at least one of the user devices that is still connected to the conference call. Turning to FIG. 3, FIG. 3 is an example of a communication flow stream that may occur prior to the conference call coordinator 115 moving the call. As can be viewed in FIG. 3, if the user device 140 leaves the conference call and, if media server 120b were to continue servicing the conference call, in order for participant devices 150 and 160 to continue on with the conference call, their respective communication flow streams 150a and 160a would unnecessarily travel to North America. Accordingly, in some embodiments, the conference call coordinator 115 determines that there are fewer conference call participants in the geographical region of media server 120a, and relocates the call conference to a media server that is within the same geographical region (e.g., region subnet) of a majority of the conference call participants.

In some embodiments, a media server within region 2 subnet 112b having excess capacity (or sufficient capacity) is selected as the media server to move the conference call to. In some embodiments, a media server within a region 2 subnet 112b is selected as the media server to move the conference call to.

Turning to FIG. 4, FIG. 4 shows an example of the participant devices 130, 150 and 160 continuing the conference call with their respective media streams 130a, 150a and 160a relocated to media server $120b_2$ that is within the region of the border device 111. In this manner, the participant devices 150 and 160 can have their media streams 150a and 160a, respectively, within the same region that the participant devices 150 and 160 are located within. This can cause a distance for the media streams 150a and 160a to be shorter than if they weren't relocated to the media server 125a. The media stream 130a to device 130 can be correspondingly lengthened.

FIG. 5 is a flow chart of a method for reducing latency of a conference call, according to an illustrative embodiment of the invention. The method can involve receiving, by a conference call coordinator (e.g., conference call coordinator 115 as described above in FIG. 1) an indicator, such as the Session Initiation Protocol (SIP) Invite or Bye message, that one user device of a plurality of user devices participating in the conference call has joined or left the conference. (Step 510). The conference call can be served by a first media server (e.g., the media server 140a, as described above in FIG. 1).

The method can also involve determining, by the conference call coordinator, whether the first media server continues to service the conference call or whether to move the conference call to a media server in a second region, based on which region has a majority of the plurality of user devices in the conference call (Step 520).

If the conference call is to be moved, the method can involve determining a media server to move the conference call to based on availability of one or more media servers servicing the plurality of user devices and moving the conference call to the second media server serving the geographical region of the majority of user devices (Step 530). In some embodiments, the destination region of the conference call can be based on determining the subnet of each of the plurality of conference call media streams.

In some embodiments, moving the conference call to the second media server involves transmitting, by the conference call coordinator, a command to take over servicing the conference call and media streams to the second media server via a Session Initiated Protocol (SIP) target refresh message.

The above-described methods can be implemented in digital electronic circuitry, in computer hardware, firmware, and/or software. The implementation can be as a computer program product (e.g., a computer program tangibly embodied in an information carrier). The implementation can, for example, be in a machine-readable storage device for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by an apparatus and can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device, a transmitting device, and/or a computing device. The display device can be, for example, a cathode ray tube (CRT) and/or a liquid crystal display (LCD) monitor. The interaction with a user can be, for example, a display of information to the user and a keyboard and a pointing device (e.g., a mouse or a trackball) by which the user can provide input to the computer (e.g., interact with a user interface element). Other kinds of devices can be used to provide for interaction with a user. Other devices can be, for example, feedback provided to the user in any form of sensory feedback (e.g., visual feedback, auditory feedback, or tactile feedback). Input from the user can be, for example, received in any form, including acoustic, speech, and/or tactile input.

The computing device can include, for example, a computer, a computer with a browser device, a telephone, an IP phone, a mobile device (e.g., cellular phone, personal digital assistant (PDA) device, laptop computer, electronic mail device), and/or other communication devices. The computing device can be, for example, one or more computer servers. The computer servers can be, for example, part of a server farm. The browser device includes, for example, a computer (e.g., desktop computer, laptop computer, and tablet) with a World Wide Web browser (e.g., Microsoft® Internet Explorer® available from Microsoft Corporation, Chrome available from Google, Mozilla® Firefox available from Mozilla Corporation, Safari available from Apple). The mobile computing device includes, for example, a personal digital assistant (PDA).

Website and/or web pages can be provided, for example, through a network (e.g., Internet) using a web server. The web server can be, for example, a computer with a server module (e.g., Microsoft® Internet Information Services available from Microsoft Corporation, Apache Web Server available from Apache Software Foundation, Apache Tomcat Web Server available from Apache Software Foundation).

The storage module can be, for example, a random access memory (RAM) module, a read only memory (ROM) module, a computer hard drive, a memory card (e.g., universal serial bus (USB) flash drive, a secure digital (SD) flash card), a floppy disk, and/or any other data storage device. Information stored on a storage module can be maintained, for example, in a database (e.g., relational database system, flat database system) and/or any other logical information storage mechanism.

The above-described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

The above described networks can be implemented in a packet-based network, a circuit-based network, and/or a combination of a packet-based network and a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth®, code-division multiple access (CDMA) network, time division multiple access (TDMA) network, global system for mobile communications (GSM) network), and/or other circuit-based networks.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes. Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method of reducing latency during a conference call, the method comprising:
    receiving, by a conference call coordinator, an indicator that one user device of a plurality of user devices participating in the conference call has joined or left the conference, wherein the conference call is served by a first media server;
    determining, by the conference call coordinator, whether the first media server continues to service the conference call or whether to move the conference call to a second media server based on whether the conference call has a majority of user devices in a geographical region of the first media server, wherein determining whether the conference call has a majority of user devices in a geographical region of the first media server comprises:
        a) determining all border devices servicing the plurality of devices, and
        b) for each border device, evaluating a media stream Internet Protocol (IP) address to determine the corresponding geographical region; and
    if the conference call is to be moved, determining a media server to move the conference call to based on availability of one or more media servers servicing the plurality of user devices and moving the conference call to the second media server serving the geographic region of the majority of user devices.

2. The method of claim 1 wherein moving the conference call to the second media server further comprises:
    transmitting to the second media server, by the conference call coordinator, a command to take over servicing the conference call and transferring media streams to the second media server via a Session Initiated Protocol (SIP) target refresh message.

3. The method of claim 1 wherein determining the region to move the conference call to is further based on the subnet values of media streams.

4. A system for reducing latency during a conference call, the system comprising:
    a plurality of user devices that allow users to connect to the conference call;
    a first media server that serves the conference calls;
    a conference call coordinator that:
        i) receives an indication that one device of a plurality of user devices has joined or left the conference call,
        ii) determines whether the first media server continues to service the conference call or whether to move the conference call to a second media server based on whether the conference call has a majority of user devices in a geographical region of the first media server, wherein determining whether the conference call has a majority of user devices in a geographical region of the first media server comprises:
            a) determining all border devices servicing the plurality of devices, and
            b) for each border device, evaluating a media stream Internet Protocol am address to determine the corresponding geographical region, and
        iii) moves the conference based on availability of one or more media servers servicing the plurality of user devices and transferring the conference call; and
    a second media server to serve a transferred conference call.

5. The system of claim 4 further comprising:
    a plurality of border devices that serve one or more of the plurality of devices, and wherein the conference call coordinator determines whether the first media server continues to service the conference call based on a geographical region of the respective border device of the plurality of border devices, the geographical region as evaluated from the Real-Time Protocol (RTP) Internet Protocol (IP) of the respective border device.

6. The system of claim 4 wherein the conference call coordinator transmits a command to the second media server to take over servicing the conference call and media streams to the second media server via a Session Initiated Protocol (SIP) target refresh message.

7. The system of claim 4 where the region to move the conference call to is further based on the subnet value of media streams at the interior of the border device.

8. One or more non-transitory computer-readable storage media comprising instructions that are executable to cause one or more processors to:
  receive, by a conference call coordinator, an indicator that one user device of a plurality of user devices participating in the conference call has joined or left the conference, wherein the conference call is served by a first media server;
  determine, by the conference call coordinator, whether the first media server continues to service the conference call or whether to move the conference call to a second media server based on whether the conference call has a majority of user devices in a geographical region of the first media server, wherein determining whether the conference call has a majority of user devices in a geographical region of the first media server comprises:
    a) determine all border devices servicing the plurality of devices, and
    b) for each border device, evaluate a media stream Internet Protocol (IP) address to determine the corresponding geographical region; and
  if the conference call is to be moved, determine a media server to move the conference call to based on availability of one or more media servers servicing the plurality of user devices and moving the conference call to the second media server serving the geographic region of the majority of user devices.

9. The one or more non-transitory computer-readable storage media of claim 8 where the instructions when executed further cause one or more processors to:
  transmit to the second media server, by the conference call coordinator, a command to take over servicing the conference call and transferring media streams to the second media server via a Session Initiated Protocol (SIP) target refresh message.

10. The one or more non-transitory computer-readable storage media of claim 8 where the instructions when executed further cause one or more processors to determine the region to move the conference call to is further based on the subnet values of media streams.

* * * * *